United States Patent

Pennino et al.

[11] Patent Number: 5,748,796
[45] Date of Patent: May 5, 1998

[54] FUZZY LOGIC DEVICE FOR IMAGE NOISE REDUCTION

[75] Inventors: Laura Pennino, Trieste; Massimo Mancuso, Monza; Federico Travaglia; Rinaldo Poluzzi, both of Milan; Gianguido Rizzotto, Civate, all of Italy

[73] Assignees: SGS-Thomson Microelectronics S.r.l., Agrate Brianza; Consorzio per la Ricerca sulla Microelecttronica nel Mezzogiorno, Catania, both of Italy

[21] Appl. No.: 519,056

[22] Filed: Aug. 24, 1995

[30] Foreign Application Priority Data

Aug. 25, 1994 [EP] European Pat. Off. ............. 94830408

[51] Int. Cl.⁶ .................. H04N 1/40; H04N 1/38
[52] U.S. Cl. ............. 382/254; 382/260; 382/264; 382/266; 358/443; 358/447; 358/463; 358/455
[58] Field of Search ................. 358/463, 447, 358/462, 455, 456, 458, 461, 443, 530, 532, 534; 382/263, 264, 266, 260, 272, 209, 205, 195, 199, 237, 219, 220, 274, 275, 254

[56] References Cited

U.S. PATENT DOCUMENTS

| | | | |
|---|---|---|---|
| 4,953,114 | 8/1990 | Sato | 382/264 |
| 5,023,919 | 6/1991 | Wataya | 382/264 |
| 5,111,285 | 5/1992 | Fujita et al. | 358/447 |
| 5,134,667 | 7/1992 | Suzuki | 358/520 |
| 5,329,599 | 7/1994 | Curry et al. | 382/264 |
| 5,339,365 | 8/1994 | Kawai et al. | 382/264 |
| 5,343,283 | 8/1994 | van Dorsselaer et al. | 358/455 |
| 5,381,490 | 1/1995 | Shin | 382/266 |
| 5,383,036 | 1/1995 | Mailloux et al. | 382/266 |
| 5,442,462 | 8/1995 | Guissin | 358/463 |
| 5,513,280 | 4/1996 | Kawamura | 382/266 |

FOREIGN PATENT DOCUMENTS

A-0 398 861 11/1990 European Pat. Off. ......... H04N 1/40

OTHER PUBLICATIONS

European Search Report from European Patent Application No. 94830408.4, filed Aug. 25, 1994.

Proceeding Of the International Conference On Fuzzy Systems, Mar. 8–12, 1992, San Diego (US): IEEE Press, New York, pp. 561–568, Fabrizio Russo "A User–Friendly Research Tool For Image Processing With Fuzzy Rules".

Proceedings Of Eusipco–92 Sixth European Signal Processing Conference, Brussels, Belgium, Aug. 24–27, 1992: Elsevier, Amsterdam, pp. 1413–1416, Fabrizio Russo, et al. "Working On Image Data Using Fuzzy Rules".

Primary Examiner—Edward L. Coles, Sr.
Assistant Examiner—Fan Lee
Attorney, Agent, or Firm—Wolf, Greenfield & Sacks, P.C.; James H. Morris

[57] ABSTRACT

A fuzzy device for image noise reduction, includes an interface adapted to retrieve the gray level of a pixel to be processed of an image and of neighbouring pixels; a difference circuit connected to the interface and adapted to generate a difference of the gray levels between said neighbouring pixels and said pixels to be processed; a fuzzy flat area smoothing circuit connected to the difference circuit and adapted to perform a low-pass smoothing of an almost homogeneous region defined by said pixel and by said neighbouring pixels; an edge preserving smoothing circuit connected to the difference circuit and adapted to perform low-pass filtering on a high-frequency information region defined by the pixel and by the neighbouring pixels; a region voter circuit connected to the interface and adapted to give a measure for considering whether the region defined by the pixel and the neighbouring pixels is almost homogeneous; and a soft switching circuit connected to the outputs of the smoothing circuit and adapted to perform the weighting of the outputs of the smoothing circuit on the basis of the measure.

8 Claims, 5 Drawing Sheets

FUZZY LOGIC DEVICE FOR IMAGE NOISE REDUCTION

BACKGROUND OF THE INVENTION

1. Field of the Invention

The present invention relates to a fuzzy logic device for image noise reduction, better known as a smoother.

2. Discussion of the Related Art

As is known, an important problem in the image processing field is the implementation of special filters, both linear and non-linear, suitable to perform noise reduction.

Within the non-linear techniques, several filters based on the Fuzzy Set Theory have been implemented. These filters can distinguish the useful signal information from the noise by comparing an input with known elements.

One drawback of known smoothers based on the Fuzzy Logic Theory is that they require a complex hardware implementation.

Furthermore, a very annoying and frequently present kind of noise is gaussian noise. Its effects are, in fact, difficult to distinguish from the true signal information, since they do not greatly affect the gray level of a pixel under study.

Therefore, one of the main problems in the implementation of these kind of smoothers is the choice between the realization of a filter with good noise reduction features, but with poor edge preserving properties, and the implementation of a smoother that maintains both high-pass information (i.e., edges) and, unfortunately, the noise effects.

Therefore, one aim of the present invention is to provide a fuzzy device for image noise reduction which provides good noise reduction action whilst preserving the useful high-pass information.

Within the scope of this general aim, an object of the present invention is to provide a fuzzy logic device for image noise reduction which is simpler in architecture than known devices.

Another object of the present invention is to provide a device with good filtering performance in the homogeneous regions of an image, whilst preserving edge details, but simultaneously reducing noise effects on those edge details.

Another object of the present invention is to provide a device which is highly reliable and relatively easy to manufacture at low costs.

SUMMARY OF THE INVENTION

This aim, these objects, and others which will become apparent hereinafter, are achieved by a fuzzy logic device for image noise reduction, characterized in that it comprises: interface means adapted to retrieve the gray level of a pixel to be processed of an image and of neighbouring pixels; difference means connected to said interface means adapted to generate a difference in the gray levels between said neighbouring pixels and said pixels to be processed; fuzzy flat area smoothing means connected to said difference means adapted to perform a low-pass smoothing of an almost homogeneous region defined by said pixel and by said neighbouring pixels; edge preserving smoothing means connected to said difference means adapted to perform low-pass filtering on a high-pass information region defined by said pixel and by said neighbouring pixels; region voter means connected to said interface means adapted to give a measure for considering whether said region defined by said pixel and by said neighbouring pixels is almost homogeneous; and soft switching means connected to the outputs of said smoothing means adapted to perform the weighting of said outputs of said smoothing means on the basis of said measure.

BRIEF DESCRIPTION OF THE DRAWINGS

Further characteristics and advantages of the invention will become apparent from the description of a preferred but not exclusive embodiment, illustrated only by way of a non-limitative example in the accompanying drawings, wherein.

DETAILED DESCRIPTION

Figure 1:
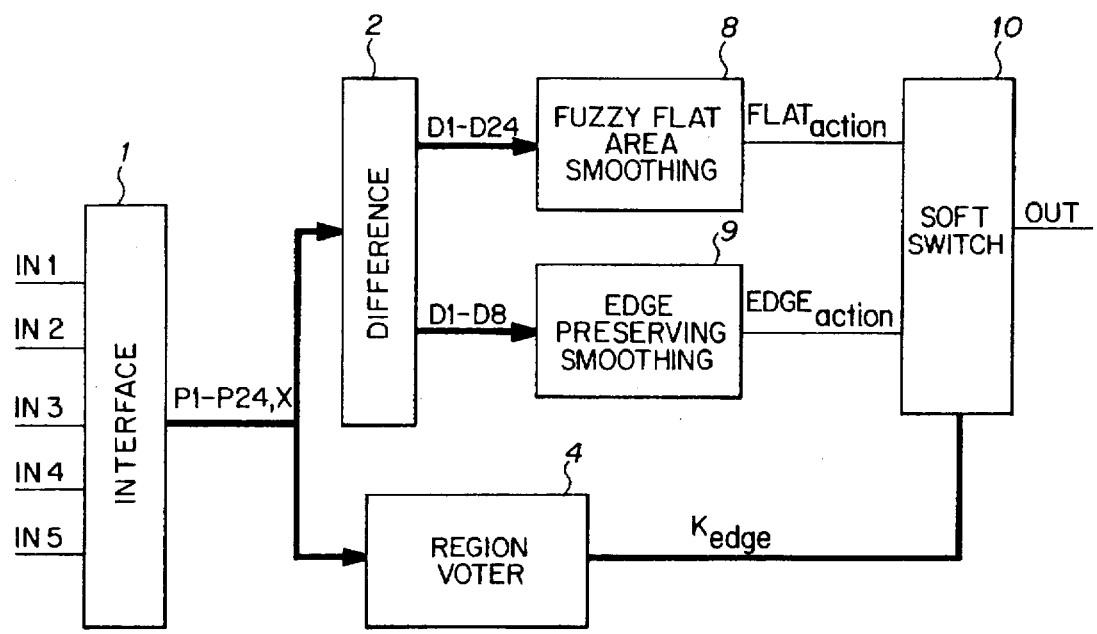
FIG. 1 is a block diagram representing the device according to the present invention.

With reference to FIG. 1, the device is provided with interface circuit 1 which receives at inputs IN1–IN5, not only the value of the gray level of the pixel which is being processed but also of the neighbouring pixels.

Figures 2A, 2B:
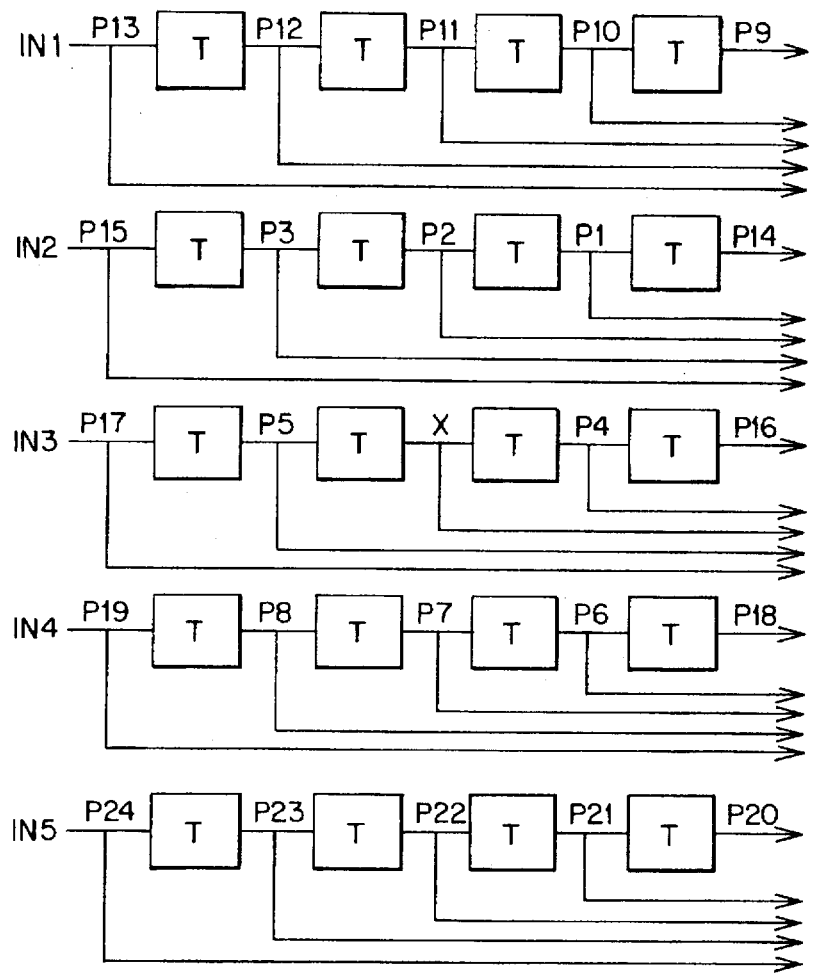
FIG. 2A is a block diagram representing the interface means of the device according to the present invention.
FIG. 2B shows an image map of the central pixel X which is being processed and the neighbouring pixels P1–P24.

The interface circuit 1 is more clearly shown in FIG. 2A. Each input IN1–IN5 is connected to a plurality of delay circuits T, five in the case of this embodiment. The outputs of the delay circuits are the gray levels for a central pixel X, which is being processed, and for the neighbouring pixels P1–P24. The neighbouring pixels P1–P24 and the central pixel X form a matrix as shown in FIG. 2B. The arrangement of pixels in FIG. 2B forms a 5×5 window or mask in the image which is being processed. The pixels have been numbered in such a way as to easily distinguish a 3×3 sub-window formed by the pixels P1–P8 and the central pixel X from the greater, 5×5 window formed by the pixels P1–P24 and the central pixel X.

Figure 3:
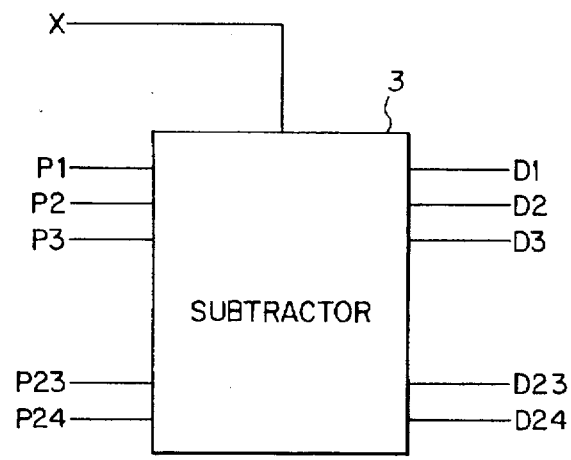
FIG. 3 is a block diagram representing the difference means of the device according to the present invention.

The interface circuit 1 is connected to difference circuit 2 which evaluates the differences $D_i$ between the gray levels of the pixels P1–P24 belonging to the mask and the central pixel X. Gray level values are received from the circuit 1. The difference circuit is more clearly shown in FIG. 3. The gray level values of the pixels P1–P24 and the gray level value of the central pixel are connected to a subtractor 3 which subtracts the gray value of X from the individual gray values of each pixel. The difference $D_i$ is given by $$D_i = P_i - X,$$

for i=1 ..., 24.

The output of the interface circuit 1, including the gray levels of pixels P1–P24 and of the central pixel X, is also connected to region voter circuit 4. The region voter circuit 4 decides whether the pixel X belongs to a uniform region of the image or not. A uniform region is a region in which there is very little difference in gray levels between the processed pixel X and the neighbouring ones. A membership grade is expressed as a number in the interval [0,1]. Based on this grade, two smoothing actions are performed: Fuzzy Flat Area Smoothing and Edge Preserving Smoothing.

Since one of the aims of the present invention is to provide for a new filter with good filtering performance in the homogeneous regions of the image whilst preserving edge details and at the same time reducing noise effects on edge details, two different actions must be implemented depending on the type of region in which pixel X lies. For example, for a uniform (homogeneous) region, a 5×5 window mask (pixels P1–P24 and X) is adopted, whilst for processing non-uniform region information, a 3×3 mask (pixels P1–P8 and X) is chosen.

The larger dimensions of the window used for the homogeneous region assures that more information on the real structure of the image being processed may be available. On the other hand, in order to preserve details, it is sufficient to use a smaller mask (3×3) so that the filtering action is not excessively affected by the presence of sharp differences in the gray levels.

The region voter circuit 4 gives a measure, expressed as a number in the interval [0,1], for considering whether the region, outlined by a larger 5×5 mask, is homogeneous. An area type parameter p, used for evaluating the type of area being considered, in this case is expressed by $$p = \frac{\sum_{i=1}^{24} |P_i - x_{ave}|}{23}$$

where $P_i$ is the gray level of each pixel and $x_{ave}$ is the average gray level of all the pixels in the mask.

Figure 4:
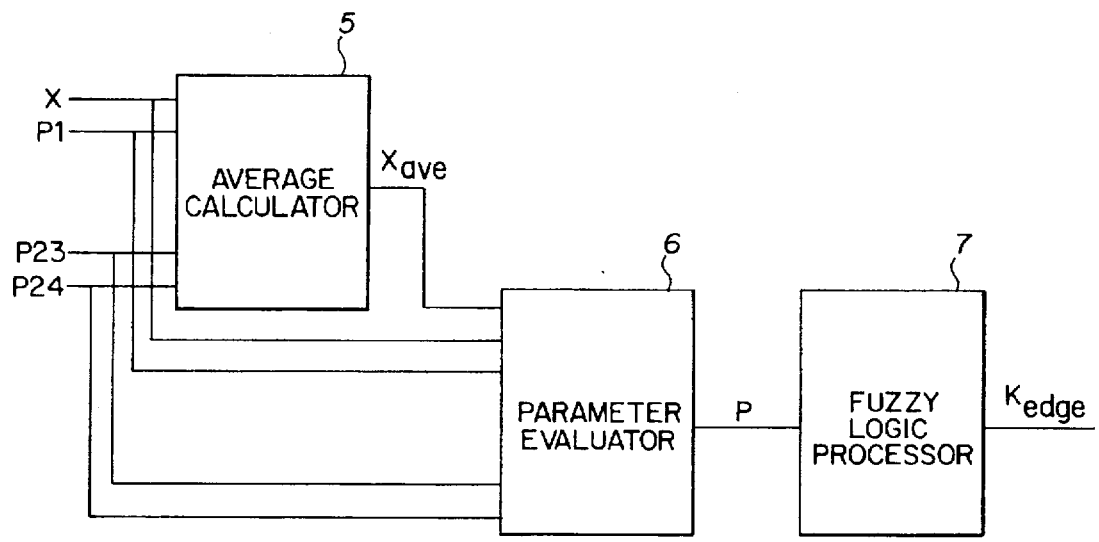
FIG. 4 is a block diagram representing the region voter means of the device according to the present invention.

The region voter circuit 4 is more clearly shown in FIG. 4. The region voter circuit comprises average calculating circuit 5 which receives, at inputs, the gray values of pixels P1–P24 and of pixel X and which calculates the average gray value $x_{ave}$ of such gray values. The output of the average calculating circuit 5, $x_{ave}$, is connected to the input of parameter evaluating circuit 6 which also receives, at inputs, the gray values of pixels P1–P24 and X and which performs the calculation described by the above-mentioned equation in order to obtain the area type parameter p.

The output of the parameter evaluating circuit 6, parameter p, is connected to fuzzy processing circuit 7, which determines the degree or grade of membership of pixel X with the feature (or fuzzy set) "homogeneous region". Such degree or grade of membership $K_{edge}$ constitutes the output of the fuzzy processing circuit.

Of course, if parameter p is small, then the region outlined by the mask can be considered homogeneous. Therefore the fuzzy processing circuit 7 can be implemented either by using a look-up table (i.e., precomputed using off-line computation) or by employing other simple arithmetic calculations.

The two smoothing actions performed are adjusted in accordance with the output values $K_{edge}$. More specifically, Fuzzy Flat Area Smoothing is weighted with the value $K_{edge}$, whilst the Edge Preserving Smoothing is applied with the weight $(1-K_{edge})$.

The Fuzzy Flat Area Smoothing is performed by fuzzy flat area smoothing circuit 8 whilst the Edge Preserving Smoothing is performed by edge preserving smoothing circuit 9. The weighting of the actions of the smoothing circuits 8 and 9 is performed by soft switching circuit 10, as will be described hereinafter.

Figure 5:
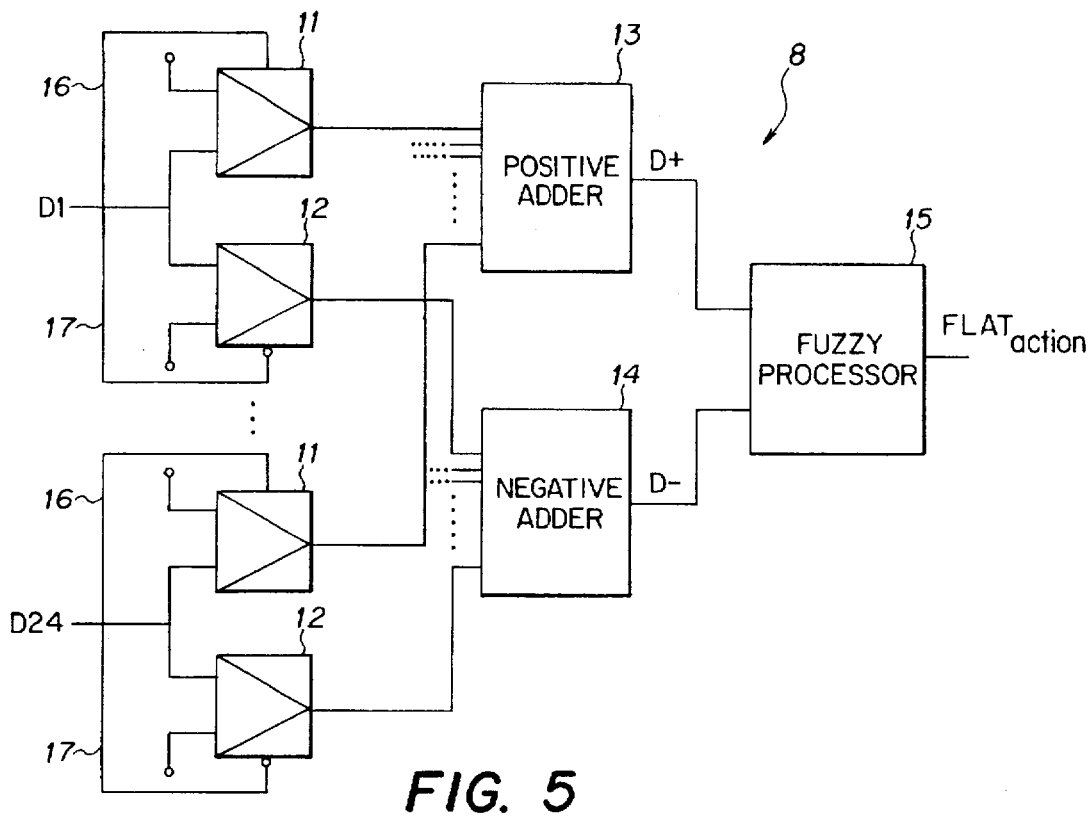
FIG. 5 is a block diagram representing the fuzzy flat area smoothing means of the device according to the present invention.

The fuzzy flat area smoothing circuit 8 is more clearly shown in FIG. 5. Such circuits perform a low-pass smoothing employing fuzzy IF . . . THEN . . . ELSE rules on an almost homogeneous area of the image. Since these smoothing means deal with a homogeneous region, the differences D1–D24 corresponding to the larger 5×5 mask are sent to its inputs, i.e. the smoothing action is performed while considering all the differences between the gray levels of the pixels P1–P24 belonging to the mask and the gray level of the central pixel X of the mask, as provided by the difference circuit 2.

Each input D1–D24 of the fuzzy flat area smoothing circuit 8 is connected to a pair of multiplexers: a first multiplexer 11 for the selective passage of positive values and a second multiplexer 12 for the selective passage of negative values. Each multiplexer 11 and 12 is enabled by the polarity of the incoming value through lines 16 and 17, i.e. if the value of input D1 is a negative value, it will enable multiplexer 12 through its inverting ENABLE input.

All of the "positive" multiplexers 11 are connected to a positive adder 13 whilst all of the "negative" multiplexers 12 are connected to a negative adder 14. If any of the differences D1–D24 is positive then the value D+ output by the positive adder 13 is increased according to the difference itself, otherwise the value D output by the negative adder 14 is increased accordingly.

The outputs of the adders 13 and 14 are connected to a fuzzy processor 15 which is adapted to establish the smoothing action.

If the value of D+ is HIGH and the value of D is LOW then almost all the differences D1–D24 obtained in the masked region are positive. This means that almost all of the pixels Pi-P24 of the mask have lighter gray levels than the central pixel X. It would therefore appear that the central pixel X has been affected by a negative peak of gaussian noise and should therefore be modified to have a lighter gray level. A similar rule can be implemented for the symmetrical case when a positive peak of noise occurs. The rules adopted for the smoothing action are consequently:

IF D+ is HIGH AND D is LOW THEN $FLAT_{action}$ IS HP;
IF D+ is LOW AND D is HIGH THEN $FLAT_{action}$ IS HN;
IF D+ is MED AND D is LOW THEN $FLAT_{action}$ IS MP;
IF D+ is LOW AND D is MED THEN $FLAT_{action}$ IS MN;

where HP and MP stand respectively for high positive and medium positive, and similarly HN and MN stand for high negative and medium negative. $FLAT_{action}$ is the output of the fuzzy processing circuit 15 and consequently, also of the fuzzy flat area smoothing circuit 8.

Therefore, the fuzzy process performed by the fuzzy processing circuit 15 implements some fuzzy IF-THEN rules with two antecendents and one consequent in order to establish the correct smoothing action.

It is, however, important to stress that this action is not the final smoothing action, but is combined with the action provided by the edge preserving smoothing circuit 9.

The edge preserving smoothing circuit 9 performs low-pass filtering on a region that has been determined to be insufficiently homogeneous by the region voter circuit 4. Using this alternate type of filtering provided by the edge preserving smoothing circuit 9, the new output value is less affected by the sharp differences of gray levels occurring proximate to an edge.

Edge Preserving Smoothing is accomplished by employing several templates to determine the actual topology of the region of the image outlined by the 3×3 mask.

For each predefined template, two simultaneous processes are performed: Fuzzy Template Matching and Fuzzy Edge Smoothing.

Fuzzy Template Matching establishes how much the region outlined by the mask resembles a particular template. This operation provides a degree of confidence that the edge within the mask region should be considered to be located in the same position as a hypothetical edge in the one of the predefined templates considered.

Fuzzy Template Smoothing, on the other hand, reduces noise effects whilst knowing the structure of the image. In this manner, the smoothing action is not excessively affected by the sharp changes in gray levels occurring at the edges.

Therefore, for each predefined template, a smoothing action is provided in two computational steps: Fuzzy Template Smoothing smoothes with the assumption that a template matches the region, while Fuzzy Template Matching evaluates the actual degree of resemblance of the considered template to the particular part of the image outlined by the 3×3 mask.

Figure 6:
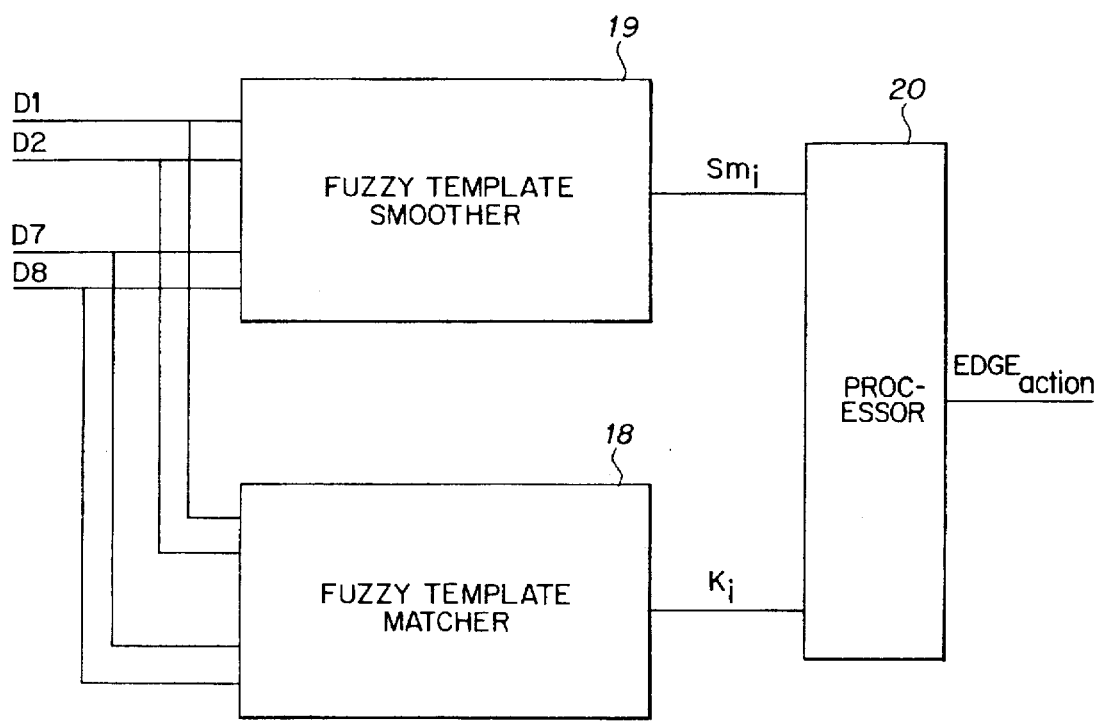
FIG. 6 is a block diagram representing the edge preserving smoothing means of the device according to the present invention.

The edge preserving smoothing circuit is more clearly shown in FIG. 6. Since this circuit deals with non-homogeneous regions (high-frequency information) they receive at their inputs the differences D1–D8 of the gray levels corresponding to the smaller 3×3 sub-window. The difference levels are provided by the difference circuit 2. Such difference levels are sent to a fuzzy template matcher 18 which performs the Fuzzy Template Matching and to a template smoother 19 which performs the Fuzzy Template Smoothing.

Figure 7:
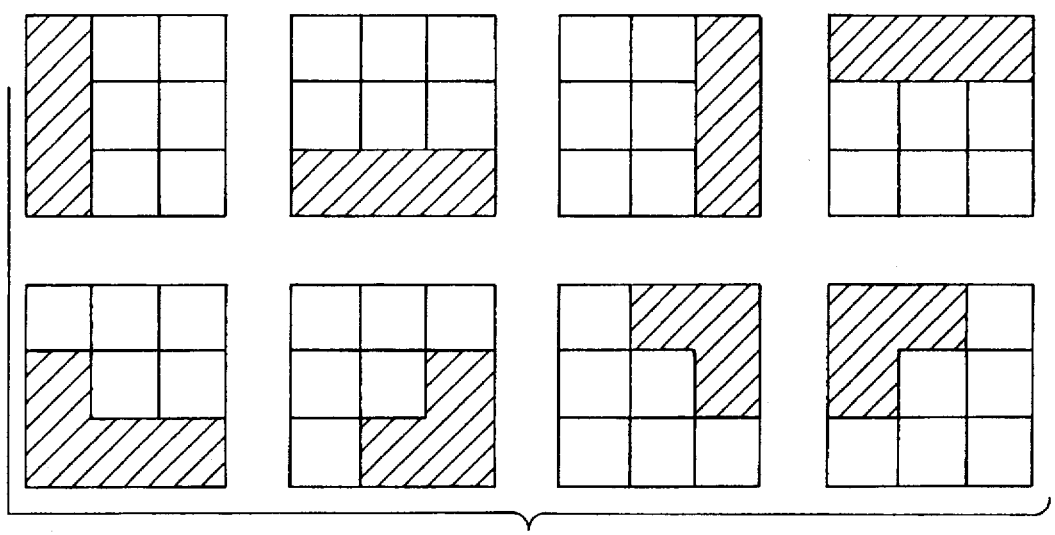
FIG. 7 is an example of a set of templates employed by the device according to the present invention.

The fuzzy template matcher 18 evaluates to what extent the region of the image included in the 3×3 window matches with one of the predefined templates. Examples of the predefined templates are shown in FIG. 7. The comparison with all of the predefined templates determines the actual topology of the region of the image included in the 3×3 mask. By knowing which template the region under study most closely matches, it is possible to perform a smoothing action without undesireably altering output pixels defining the sharp differences of the edge. In this manner, high-frequency information is preserved.

The fuzzy template matcher 18 calculates an activation level parameter $K_i$ which is used for evaluating the topology of the considered area. Such parameter is given by the following expression:

$$K_i = \frac{\sum_{i=1}^{6} |P_i - X|}{5}$$

where $P_i$ represents gray levels of the pixels belonging to the 3×3 mask and X is the gray level of the central pixel to be processed. Therefore the parameter $K_i$ is a sum of differences divided by the number of pixels considered, and is computed for each template. For each template, the differences are computed considering only the pixels that do not belong to an edge, i.e. the pixels not darkened in FIG. 7.

If the region of the image included in the 3×3 mask resembles a particular template, then the parameter $K_i$ will have small values. Based on this parameter, a fuzzy logic process is performed by the fuzzy template matcher 18 to evaluate the degree of likehood of a match between the region included in the 3×3 mask and a considered template. Such fuzzy logic process is similar to the one implemented by the region voter circuit 4 but performed on a different kind of area.

However, in contrast with the region voter circuit 4, no calculation of the average among the pixels of the mask is computed. This is a significant computation reduction, since the average computation operation is conventionally evaluated for each template, considering different "homogeneous" pixels each time. In accordance with the present invention, instead, all the differences are computed only once for all the considered templates and during the evaluation of the matching degree between the region of the image and each template, only the useful differences are employed.

The smoothing of a non-uniform region (Fuzzy Template Smoothing) is performed by the fuzzy template smoother 19. The configuration of this smoother 19 is similar to the fuzzy flat area smoother 8 (FIG. 5). The only significant difference is that the smoothing action is computed after considering the existence of an edge. Again, the differences D1–D8 between the gray levels of the pixels P1–P8 of the 3×3 mask and the central pixel X are computed. If the differences are positive, then the value D+ of the positive adder is increased by the differences themselves, otherwise the value D of the negative adder is increased. According to the sign of these differences with a fuzzy logic based process an output value of the smoothing action $Sm_i$ is computed. The overall filtering action $EDGE_{action}$ provided by the edge preserving smoothing circuit 9 is a weighted sum of the smoothing action $Sm_i$ and of the parameters $K_i$ evaluated by the fuzzy template matcher 18. Therefore, $K_i$ is the level of activation of each template while $Sm_i$ is the smoothing action provided by the fuzzy filter with respect to each predefined template.

In this particular embodiment only eight templates have been used. The overall smoothing action performed by the edge preserving smoothing circuit is calculated by processing circuit 20 according to the following expression:

$$EDGE_{action} = \frac{\sum_{i=1}^{8} |K_i * Sm_i|}{7}$$

Finally, returning to FIG. 1, the output $FLAT_{action}$ of the fuzzy flat area smoothing circuit 8 and the output $EDGE_{action}$ of the edge preserving smoothing circuit 9 are sent to the soft switching circuit 10 which performs the soft switching between the two different smoothing actions. The weight of the two actions is computed according to the parameter $K_{edge}$ sorted out initially by the region voter circuit 4. The Fuzzy Flat Smoothing Action, $FLAT_{action}$, is weighted with the value $K_{edge}$; whilst the Edge Preserving Smoothing Action, $EDGE_{action}$, is applied with the weight $(1-K_{edge})$.

This weighted sum corresponds to the implementation of a fuzzy IF . . . THEN . . . ELSE rule where the THEN part is represented by the Fuzzy Flat Smoothing and the ELSE part is represented by the Edge Preserving Smoothing.

In that manner, the soft switching circuit 10 generates a new output value OUT of pixel X which is being processed.

It is important to stress that the structure of all the blocks described is very simple: most of the blocks require the same operations such as computing the differences among the gray levels of the pixels belonging to the mask and of the central pixel to be processed. All the division operations performed are division by a constant. Consequently they are very easy to implement from a hardware point of view. Even the dimensions of the memories employed for storing the fuzzy processes are very restricted.

Therefore a device for noise reduction on video signal has been provided. An efficient smoothing action is performed, because the actual topology of the processed image is determined and applied. The soft switching circuit allows merging together of the two filtering actions performed respectively on a region of the image considered homogeneous and on a region of the image with many high-pass details.

The result of merging a classical approach with a fuzzy logic based approach accomplishes a smoother action with good behaviour both for achieving noise reduction and for preserving high-frequency information (edges). The table-like approach for the fuzzy information storage guarantees the possibility of a very simple implementation.

The invention thus conceived is susceptible to numerous modifications and variations, all of which are within the scope of the inventive concept.

For example masks having different sizes may be used, as well as a larger and more varied group of templates.

Finally, all the details may be replaced with other technically equivalent ones. For example, each of the circuit blocks described may be embodied as software program instructions executing in a general-purpose or in a special-purpose computer.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A fuzzy logic device for image noise reduction, comprising:

interface means for receiving a gray level of a pixel to be processed and of neighboring pixels within an image;

difference means connected to said interface means for generating a difference between gray levels of said neighboring pixels and of said pixels to be processed;

fuzzy flat area smoothing means connected to said difference means for performing a low-pass smoothing of an almost homogeneous region defined by said pixel and said neighboring pixels including a positive adder for adding positive differences generated by said difference means, a negative adder for adding negative differences generated by said difference means, and second fuzzy processing means for making a fuzzy inference on the sums of said negative and said positive differences in order to generate the output of said fuzzy flat area smoothing means;

edge preserving smoothing means connected to said difference means for performing low-pass filtering on a high-frequency information region defined by said pixel and said neighboring pixels;

region voter means connected to said interface means for determining whether said region defined by said pixel and said neighboring pixels is almost homogeneous and outputting a measure representative of said determination; and soft switching means connected to the outputs of said fuzzy flat area smoothing means and said edge preserving smoothing means for weighting outputs of said fuzzy flat area smoothing means and said edge preserving smoothing means on the basis of said measure.

2. The fuzzy logic device, according to claim 1, wherein said difference means comprises a subtractor adapted to generate a difference of the gray levels between said neighboring pixels and said pixels to be processed.

3. An image noise reducer comprising:

interface means for receiving a plurality of pixels comprising a region, the region including a sub-region of less than all of the plurality of pixels, and the sub-region including a pixel to be processed, including difference means connected to said interface means for generating a difference between gray levels of neighboring pixels and of said pixel to be processed;

a filter connected to receive the region of pixels from the interface means, having as a first output a new value of the pixel to be processed computed assuming the region had no sharp transitions, and having as a second output a new value of the pixel to be processed computed assuming the sub-region had at least one sharp transition, the filter including a fuzzy template matcher for evaluating resemblance between said region and each of a plurality of templates of sharp transition locations, a fuzzy template smoother for filtering said sub-region without significantly reducing the at least one sharp transition, processing means connected to the outputs of said fuzzy template matcher and said fuzzy template smoother for generating a weighted sum of said outputs of said fuzzy template matcher and said fuzzy template smoother, said weighted sum being the second output of the filter, a positive adder for adding positive differences generated by said difference means, a negative adder for adding negative differences generated by said difference means, and second fuzzy processing means for making a fuzzy inference on the sums of said negative and said positive differences in order to generate the output of said filter;

region voter means connected to receive the region from the interface means, for producing an output representative of a degree to which the region has at least one sharp transition; and a soft switch, having as inputs the first output and the second output of the filter, and producing an output which is a weighted average of the inputs in response to the output of the region voter means.

4. The image noise reducer of claim 3, further comprising:

a difference means including a subtractor adapted to generate a difference of the gray levels between pixels of the plurality of pixels, the difference means corrected between the interface means and the filter means.

5. An image processor, comprising:

interface means for receiving a plurality of pixels;

a first filter connected to receive a plurality of the pixels and producing a first filtered output, the first filter including a positive adder for adding positive differences generated by said difference means, a negative adder for adding negative differences generated by said difference means, and second fuzzy processing means for making a fuzzy inference on the sums of said negative and said positive differences in order to generate the output of said first filter a second filter connected to receive a plurality of the pixels and producing a second filtered output, the second filter including a fuzzy template matcher for evaluating resemblance between said plurality of pixels and each of a plurality of templates, a fuzzy template smoother for performing low-pass filtering on said plurality of pixels, and processing means connected to the outputs of said fuzzy template matcher and said fuzzy template smoother for generating a weighted sum of said outputs of said fuzzy template matcher and said fuzzy template smoother, said weighted sum being the output of said second filter a grader connected to receive a plurality of the pixels and producing a grade output representative of a predetermined characteristic of the plurality of pixels; and a soft switch connected to receive as inputs the first filtered output, the second filtered output and the grade output, and producing a processed image output which is a combination of the first filtered output and the second filtered output in a proportion determined as a function of the grade output.

6. The image processor of claim 5, further comprising:

a difference means including a subtractor adapted to generate a difference of the gray levels between said pixels of said plurality of pixels, the difference means connected between the interface means and the first and second filter means.

7. A method of processing an image signal, comprising the steps of:

receiving a region of the image signal into a buffer;

grading the region received according to a predetermined grading function;

generating a difference between gray levels of neighboring pixels in the region and of a pixel to be processed;

filtering the received region using a first filter to form a first filter output, including steps of:

evaluating resemblance between said region and each of a plurality of templates, performing low-pass filtering on said region, generating a weighted sum of said resemblance evaluated and said low pass filtering performed, said weighted sum being the second filter output, adding positive differences generated, adding negative differences generated, and making a fuzzy inference on the result of the steps of adding in order to generate the second filter output, filtering the received region using a second filter to form a second filter output; and combining the first filter output and the second filter output in a proportion determined as a function of the grade of the region.

8. The method of processing an image signal of claim 7, further comprising the step of:

subtracting gray levels of pixels in the region.

* * * * *